May 15, 1962   R. S. MACKAY, JR   3,034,503
DIVING EQUIPMENT
Filed Aug. 5, 1955

INVENTOR.
Ralph S. Mackay Jr.

3,034,503
DIVING EQUIPMENT
Ralph S. MacKay, Jr., 1786 Spruce St., Berkeley, Calif.
Filed Aug. 5, 1955, Ser. No. 526,650
5 Claims. (Cl. 128—142)

The present invention relates to improvements in equipment for divers, especially self contained underwater breathing apparatus, that is, equipment in which the diver is autonomous or independent of any fixed supply of breathing gas lying either above or below the level of the water. In one form of such equipment compressed breathing air carried in a high pressure cylinder is delivered to the diver upon inspiration through a regulator which automatically adjusts the pressure of the gas being breathed to that of the surrounding water pressure. However, since the pressure sensing mechanism in the regulator is not located precisely at the level of the lungs, for some orientations of the diver, there will be a small inequality in pressure between the breathed gas and the hydrostatic pressure against which the lungs must expand and contract. In the case of closed system (rebreather) equipment in which a given gas is recycled over and over again, one breathes to and from a flexible bag which will often lie at a slightly different level than the center of the chest. Here also there will be a hydrostatic pressure difference between the lungs and the compressed air for certain orientations of the diver.

It is the object of the present invention to feed the diver breathing gas at just the effective pressure on his lungs regardless of his position in the water. This will reduce the incidence of lung fatigue in those cases where he must make an effort to inspire and will eliminate an unpleasant tendency towards inflation accompanied by difficulty in exhaling when in those positions in which the air pressure is higher than that in his lungs. The above is accomplished by loading the regulator or breathing bag with a weight so the internal pressure is slightly different from that of the immediately surrounding water.

The invention will now be described with reference to the accompanying drawing in which.

Figure 1:
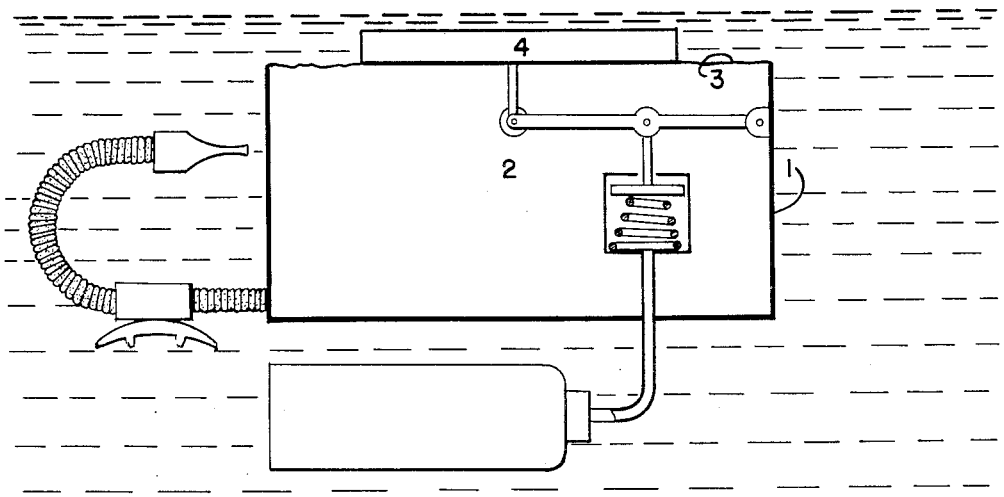
FIG. 1 is a schematic sectional side view of the low pressure regulator with its modification.

Referring to FIG. 1, item 1 is the housing of any standard breathing regulator such as is customarily used by deep sea divers, high altitude airplane pilots, and in medical breathing units. Contained therein, at 2, are the valves and linkage of any standard regulator mechanism (e.g. such as that described by Cousteau et al. in Pat. No. 2,485,039 or by Nourse et al. in Pat. No. 2,695,609). At 3 is shown the diaphragm against which the water presses from the outside and behind which the air pressure builds up to equality with the surrounding water pressure. This diaphragm would normally be deflected by any decreased pressure inside the regulator below that of the surrounding water pressure until equality of pressure was returned by air flow, after which it would close the valves of the mechanism. In the present case a weight 4 is attached to the diaphragm and, under the action of gravity, it will either add to or subtract from the hydrostatic pressure acting from without on the diaphragm 3. The magnitude of the weight 4 is chosen so that the pressure inequality will be just equal to the difference in pressure between the diaphragm and the lungs. Since the effect of the water column varies with the cosine of the angle between the vertical and the normal to the diver's body, just as does the effect of the weight on the regulator, if compensation is correct for one position of the diver then it will be correct for all orientations.

In the case of closed-circuit or rebreather equipment there must be a flexible reservoir some place in the system to and from which the respired air passes. This variable volume reservoir can be pressed upon by a compensating weight in exactly the same manner to compensate for position effects leading to inflation or effort in breathing.

Depending on whether the weight is situated to push in or pull out on the diaphragm, the regulator must face towards or away from the diver's body. If the regulator is on the diver's back the weight must be placed so that when the diver faces down the pressure is greater than the pressure existing in the region of the diaphragm, and when he faces up, less. Then the pressure matches the water pressure at the lungs and does away with changes of breathing as he changes his position.

Compensation can be accomplished by attaching to the diaphragm, or its associated linkage, any material differing in density from its surroundings. Thus one might compensate a regulator with a float, in this case turning the regulator through 180 degrees with respect to the diver's body. However this produces a considerably larger and less convenient unit. If the compensating material is in water and is attached to the diaphragm, and has the same area, then its thickness must be approximately half the chest thickness divided by the (specific gravity $-1$) of the compensating material.

Having effectively placed the regulator in the diver's lungs, it must now be certain that air will not be wasted under any conditions by accidental passage through the outlet valve (in an open circuit system) which, though physically at the same level as the regulator, is now effectively separated from it. The outlet valve could be compensated separately with its own compensating weight. One form of another scheme is shown schematically in FIG. 2 in which the regulator, 1, 2, 3, itself activates the outlet valve in an open circuited system. Here the diaphragm 3, shown with a stiffener at its center, activates a lever 6, about a fulcrum 7, through the attachment 5. The mass of the lever 6 can be all or part of the compensating weight (and is here shown as the total compensation). When one breathes in the diaphragm 3 is deflected inward thus producing a flow of air into the regulator and to the diver. When one breathes out the diaphragm 3 is deflected outward thus opening the outlet valve from which the air will be released. In the figure the outlet valve is shown as the end of a "bronx cheer" one-way valve at 8. Item 9 is the stop, over or against which the bronx cheer is pressed to close it. A different class or type of lever could be used or a different type of outlet one-way valve could be employed; the present combination is given as a convenient specific embodiment. In all cases one must have both the action of a controlled valve and also a non-return action to insure that no air will be wasted nor any water leak back in any position.

Figure 2:
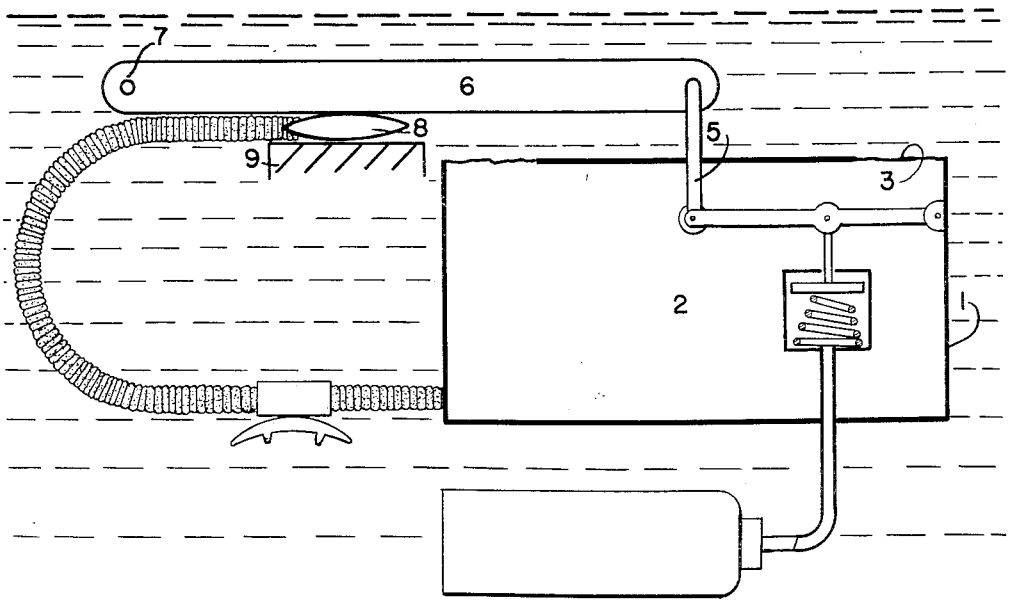
FIG. 2 is a compensated regulator with a suitable outlet mechanism for the expired gases.

This combination shown in FIG. 2 will not leak air in any position, will not allow water to leak back to the diver in any position, allows normal equally easy inspiration in all positions, and allows normal easy expiration in the most common positions. In the one set of positions for which the air pressure is below that of the water pressure on the outlet valve 8 the effort in breathing out is the same as for an uncompensated regulator. This final inconvenience can be eliminated by having the outlet 8 void into a low pressure reservoir consisting of two tubes, one opening to the water in front of the diver and the other opening to the water behind the diver, and each have an outwardly directed one-way valve at its far end. The pressure in this tube will be the pressure at the end of the tube which finds itself highest in the water for the particular position of the diver, and this pressure will always be sufficiently low so that there will be no effort in breathing out.

Other modifications could also be made in the above described apparatus without departing from the spirit of the invention, the scope of which is to be determined by the following claims in which the word "regulator" designates the last regulator, when two or more are disposed in series, and the word "diaphragm" designates the diaphragm of the last stage when a multi-stage regulator is utilized. In controlling the outlet other types or combinations of non-return and ordinary valves can be employed and one of the other classes of lever can be used. The relative positions of diaphragm and outlet can be changed. Supply of air from carried cylinders is common but not essential to my invention since a regulator supplied by a hose from the surface could as well be compensated.

What is claimed is:

1. In a breathing apparatus including means forming a breathing circuit adapted to be used by a diver and attached to his body and including a pressure regulator in said circuit responsive to the pressure of the adjacent water, the improvement comprising a compensating weight effective upon said regulator and mechanically connected thereto, said weight being of a quantity to produce substantially the same effect as a water column of a height equal to the vertical distance between said regulator and said diver's lungs.

2. In a breathing apparatus including means forming a breathing circuit adapted to be used by a diver and attached to his body, an outlet from said circuit, a pressure regulator in said circuit responsive to the pressure of the adjacent water, the improvement comprising a compensating weight effective upon said regulator for producing upon said regulator substantially the same effect as a water column of a height equal to the vertical distance between said regulator and said diver's lungs, and means for throttling said outlet in accordance with said effect of said weight.

3. In a breathing apparatus adapted to be worn by a diver including an air circuit and a water pressure responsive regulator for said air circuit, the improvement comprising a weight equivalent to that of a water column having a height equal to the vertical distance between said regulator and said diver's lungs connected to modify the regulating action of said regulator.

4. In a breathing apparatus adapted to be worn by a diver in variously oriented positions of his body including a breathing inlet circuit, and a pressure regulator sensitive to the pressure of the adjacent water for correspondingly establishing the pressure in said inlet circuit, the improvement comprising a weight forming part of said apparatus and effective in all of said oriented positions to modify the action of said pressure regulator, said weight being in effect substantially equivalent to a water column having a height equal to the vertical distance between said regulator and said diver's lungs.

5. A structure as in claim 4 also including a breathing outlet circuit and in which said weight comprised in said improvement is effective correspondingly to throttle said outlet circuit.

References Cited in the file of this patent

UNITED STATES PATENTS

| | | |
|---|---|---|
| 2,300,273 | Connell | Oct. 27, 1942 |
| 2,896,616 | Arborelius | July 28, 1959 |
| 2,918,061 | Gruget | Dec. 22, 1959 |
| 2,944,544 | Lundgren | July 12, 1960 |
| 2,989,062 | Gruget | June 20, 1961 |

FOREIGN PATENTS

| | | |
|---|---|---|
| 877,868 | Germany | May 28, 1953 |